(12) United States Patent
Presby

(10) Patent No.: US 6,792,977 B2
(45) Date of Patent: Sep. 21, 2004

(54) END CAP FOR A CORRUGATED CONDUIT

(76) Inventor: David W. Presby, P.O. Box 617, Sugar Hill, NH (US) 03585

( * ) Notice: Subject to any disclaimer, the term of this patent is extended or adjusted under 35 U.S.C. 154(b) by 74 days.

(21) Appl. No.: 10/023,431

(22) Filed: Dec. 14, 2001

(65) Prior Publication Data

US 2002/0079009 A1 Jun. 27, 2002

Related U.S. Application Data

(60) Provisional application No. 60/256,211, filed on Dec. 16, 2000.

(51) Int. Cl.$^7$ ................................................ F16L 55/10
(52) U.S. Cl. ........................ 138/89; 138/96 R; 220/229; 220/782; 220/786
(58) Field of Search .................... 138/89, 90, 96 R; 220/229, 782, 786, 791, 793

(56) References Cited

U.S. PATENT DOCUMENTS

| | | | |
|---|---|---|---|
| 598,161 A | * 2/1898 | Sahlstrom | ................... 138/96 R |
| 1,853,946 A | * 4/1932 | Unke | ....................... 138/96 T |
| 3,583,710 A | * 6/1971 | Burelle | ......................... 277/101 |
| 3,654,965 A | * 4/1972 | Gramain | ..................... 138/89 |
| 3,840,152 A | * 10/1974 | Hodge | ..................... 220/60 R |
| 3,911,960 A | * 10/1975 | Flimon | ..................... 138/96 R |
| 4,687,117 A | * 8/1987 | Terauds | ..................... 220/306 |
| 5,071,017 A | * 12/1991 | Stull | ..................... 215/260 |
| 6,138,854 A | * 10/2000 | Kaneko et al. | ............. 220/254 |

* cited by examiner

*Primary Examiner*—James Hook
(74) *Attorney, Agent, or Firm*—George W. Dishong

(57) ABSTRACT

An end cap for a corrugated conduit, attachable to the open end of conduit preferrably corrugated conduit. The end cap has a cylindrical skirt portion and an end piece, a plurality of inwardly-directed latching tabs spaced around the cylindrical skirt portion and which are springingly deflectable in a radially outward direction when the latching tabs are forceably urged over the corrugated conduit open end. The latching tabs spring inwardly when the diameter of the corrugated conduit decreases, thereby latching the end cap over the open end. The end cap may further have an arcuate configuration for the end piece where the cylindrical skirt portion has an inside diameter greater than the outside diameter of the corrugated conduit. The end piece may also have an axially-directed aperture with a center not centered on the axis of the corrugated conduit. The axially-directed aperture may have a plurality of deflectable radially inwardly-directed tabs which tabs firmly press against a smooth-walled conduit, such as a pipe or hose, which may be inserted into the axially-directed aperture. The curvature of the end piece and the location of the axially-directed aperture may be formed as desired and determine angle of entry of a conduit inserted into the axially-directed aperture, thereby providing variable entry positions and angles as required for a particular conduit or application.

17 Claims, 8 Drawing Sheets

END CAP FOR A CORRUGATED CONDUIT

CROSS-REFERENCE TO RELATED APPLICATIONS

This application claims priority to the Provisional Application of the same title, Serial No.: 60/256,211; Filed Dec. 16, 2000.

STATEMENT REGARDING FEDERALLY SPONSORED RESEARCH OR DEVELOPMENT

Not Applicable.

BACKGROUND OF THE INVENTION

1. Field of the Invention

The invention relates most generally to end cap devices used to act as closure members for corrugated conduits. More particularly this invention relates to a specially designed end cap which provides enhanced resistance to tensile forces against the end cap, while providing an angled entry port for connecting hoses. Even more particularly the invention relates to a specially designed end cap that fits onto a corrugated cylindrical conduit which has ridges, channels and grooves over which a plurality of tabs provides durable connection between the end cap and the corrugated conduit by fitting securely between the corrugated conduit ridges, channels, or grooves. And further the invention provides strength-enhancing and stress reduction characteristics, primarily comprising selective thickening of the capping material, selective placement of ribbing, and non-tearing fingers at the entry point of a sewer and drain-pipe hose.

2. Description of Related Art

There are many devices used in terminating pipe and/or conduit. In most instances, the devices are not designed for enhancing strength in both the cap and the connection between the cap and the conduit, but only for providing a closure sufficient to restrict the entry of dirt and other possible contaminants. It would be advantageous to have an end cap especially for closing corrugated pipe which emphasizes or addresses the multiple facets of an easy-to-use, versatile, and highly functional closure.

There is nothing currently available which satisfies these needs and objectives. However, the invention disclosed herein does meet all of these objectives. No prior art of which applicant is aware is as effective and as efficient as the instant end cap. Clearly, the instant invention provides many advantages over the prior art known by applicant. Again it is noted that none of the prior art meets the objects of the end cap as used in septic and waste water treatment in a manner like that of the instant invention. None of them is as effective and as efficient.

It is also important to note that the use of the end caps of the present invention permits the easy terminating of conduit sections and more particularly the angular insertion of connecting hoses to corrugated plastic septic pipe used in septic systems. The end caps may be used with standard forms of corrugated pipe and with special designs of corrugated pipe as long as the pipe contains some form of circumferential ribbing or perforation.

Prior art in the field of end caps mostly discloses an end cap having a separate clamping mechanism, which is different from the connecting tabs of the present invention. Prior art that does not require a separate clamp, such as U.S. Pat. No. 3,711,632, requires hinged sections, not a single-piece closure arrangement '632 discloses an end fitting comprising a pair of sections for corrugated tube that is used for holding electrical leads. In claim 2, claimed sections are hinged and connected together by releasable latching having a catch member on one of the sections and a latch member on the other. One end of each section has an arcuate and circumferentially and radially inwardly extending rib that is adapted to be received between adjacent corrugations of the corrugated tube to substantially lock the end fitting against relative movement axially of the tube. This invention requires hinged sections that are disposed upon a piece of corrugated pipe. In a preferred form, this disclosure relates to an end fitting for use for a flexible, plastic, axially slit, corrugated tube for housing a plurality of electrical leads. The end fitting includes a pair of sections of generally semicircular cross-sectional shape which are integrally hinged by a hinge means along their adjacent side edges thereof and which are foldable about the hinge means to a closed position in which they surround the corrugated tube, and a releasable latching means for latching the sections together in their closed position. One end portion of each of the sections has arcuate, circumferentially and radially inwardly extending ribs which are adapted to be received between adjacent ones of the corrugations of the corrugated tube to lock the end fitting against relative movement axially of the tube, and the other end portions of the sections each have a radially inwardly extending member, the inwardly extending members defining a chordially extending barrier when the sections are in their closed positions so as to position the leads within the end fitting.

U.S. Pat. No. 3,713,463 discloses a closure member for sealing a pipe that is a cap of rubber with a cylindrical skirt and ridges on the inner circumference to engage the outer periphery of the pipe. As claimed, this device requires a clamp to surround and constrict the skirt against the outer periphery of the pipe. The closure member comprises a cylindrical cap of rubber or other elastomeric material, the cap being closed at one end and having inwardly and circumferentially extending ridges around the inner periphery of its skirt to engage the outer periphery of the pipe. A clamp surrounds the skirt and is adapted to constrict the skirt against the pipe to seal the latter.

U.S. Pat. No. 4,112,979 discloses an end cap for a pipe, having a tubular sleeve with spaced tongues extending substantially parallel to the axis of the sleeve. The sleeve is surrounded by a clamping ring that is fastened to the sleeve by a sealing ring. The end cap is formed with a sleeve of plastics material closed at a first end by a wall and having tongues formed integrally with the sleeve on the opposite or second end. These tongues fit in openings in a plastics clamping ring at the second end of the sleeve and engage with a side of the ring to prevent removal of the clamping ring. The clamping ring holds a sealing ring of rubber material around the inside of the sleeve for sealing engagement with the pipe fitted into the sleeve through the second end of the latter.

U.S. Pat. No. 5,758,693 discloses a sewage hose end cap that can be placed on a spiraling hose end and secured tightly by a clamp mechanism. The end cap for a flexible hose includes a depending pivotable member attached to an outer wall. The pivotable member can be swung upwardly between the inner and outer walls of the end cap to secure the end of a flexible hose therein. The end cap is integrally formed such as by molding from a medium density polymeric material such as polyethylene and includes an integral clamp mechanism to insure retention of a flexible hose therein. This end cap is not suitable for corrugated conduit piping.

None of these patents provides for a light-weight, yet durable, strong, and easy to engage end cap device for conduit/pipe particulary corrugated conduit. Many require extra clamps and steps for installation, and none has the additional sewer and drainpipe hose feature.

SUMMARY OF INVENTION

In the most fundamental aspect of the present invention, there is provided an end cap device for quickly, effectively, simply, safely and economically providing closure to the end of a section of conduit piping. The preferred end cap consists of a formed, preferably plastic, cap with an end piece that curves into a skirt which is diametrically sized to fit snugly over a conduit section, preferably a corrugated conduit section. Within the end cap, integral with the skirt, and hingedly attached, is a plurality of tabs whose unattached ends contain triangular wedges which protrude towards the outer surface of the conduit (and towards the interior of the end cap) and which can be lodged within recesses (valleys of the corrugations) of the corrugated conduit as the end cap is pressed onto the corrugated conduit or pressed onto a smooth walled conduit wherein a groove or valley is created at a distance from the open end so as to be mateable with the connection/connecting tabs.

Each triangular wedge causes the tab to which it is connected to swing (or be pushed) away from the corrugated conduit until the wedge reaches a recess (valley) between the protrusions (peaks) of the corrugated conduit. At that time, the wedge's shelf-like edge moves into adjacency with the lower edge of the protrusion (peak) that the wedge has just been pushed past. If the end cap is pressed again, the tab and wedge, when encountering the next corrugated conduit protrusion, swing (are pushed) away again from the corrugated conduit outer surface until, once again, a recess between protrusions is reached, where once again the wedge is lodged and the end cap is fixed in closure position on the corrugated conduit.

On the end piece can be stamped or perhaps cut out one or more holes to receive a sewer and/or drainpipe hose. If an end cap is manufactured to accept a sewer and drainpipe hose, in the preferred embodiment, the cut out hole is fitted around its circumference with flexible fingers that can bend either towards the inner or the outer surface of the end cap to accommodate the insertion of a sewer and drainpipe hose. In the preferred embodiment, the fingers are integrally and hingedly attached to a continuous ring. At the hinge point of each finger, and on either side of each finger, is drilled an enlargement or hole to reduce the stress on the finger as it swings back and forth. This stress reduction mechanism increases the structural durability of the finger assembly.

An additional novel feature of this invention involves additional strengthening due to the addition of strengthening ribs or other devices that increase structural durability while maintaining a light-weight and easy to handle end cap. Anywhere on the end cap, but in particular in the vicinity of or surrounding areas on the end cap that will experience increased stress in the course of usage, are ribs which comprise a band of thickened material. In the preferred embodiment, the thickened material takes the cross-sectional shape of an apex-flattened equilateral triangle, although any shape is possible. The base of the triangle is flush with the surface of the end cap. In the preferred embodiment, the end cap is thickened in the area of the sewer and drainpipe hose insertion holes or recesses. The thickened material traverses the end cap in the shape of an hourglass, in the preferred embodiment, in which the thin area of the hourglass runs between the point at which the two example sewer and drainpipe hose entry points are most closely tangential. The thickened material could inscribe any shape, such as encircling the sewer and drainpipe entry holes. In addition, strengthening ribs could also be included to surround the openings in the circumferential skirt where the connection tabs are located.

Another novel feature of the instant end cap is the arcuate shape of the end piece which is, in the preferred embodiment, convex towards the point at which closure pressure would be applied to the end cap. The apex of the arced end piece can form any angle with the vertical. In the preferred embodiment, however, and where there is accommodation for sewer and drainpipe hoses, the angular displacement from the vertical axis parallel with the apex of the end piece sets the entry angle of the sewer and drainpipe hose which determines the level at which the corrugated conduit may be filled before its contents enter and/or leave the sewer and drainpipe. In addition to providing for off-axis entry of sewer and drainpipe hoses, the arced end piece provides for additional structural integrity, especially during the pressure of inserting the end cap onto the end of the corrugated conduit. Further, the arced end piece increases the rigidity and structural integrity of the end cap during the insertion and extraction of sewer and drainpipe hoses.

It is therefore a feature of the present invention to provide an end cap for a conduit, preferably a corrugated conduit, that can be immovably positioned onto a corrugated conduit through lodging of at least one tab, but preferably a plurality of tabs which are integral to the end cap, into the recesses or valleys of the corrugated conduit.

Another feature of the present invention is to provide an end cap that is selectively strengthened through integral thickened ribbing in areas that experience enhanced stress during the usage of the end cap.

Another feature of the present invention is to provide an end cap that allows for insertion and removal of sewer and drainpipe hoses of various diameters through pre-punched holes in the end piece of the end cap.

A further feature of the present invention is to provide an end cap in which insertion points for sewer and drainpipe hoses are circumferentially fitted with a plurality of flexible, tear-resistant fingers to allow easy insertion of sewer and drainpipe hoses and resistance to hose movement within the insertion point.

A yet still further feature of the present invention is to provide an end cap with a convex curved end piece that allows for additional strength of the end cap and for off-axis positioning of sewer and drainpipe hoses.

BRIEF DESCRIPTION OF THE SEVERAL VIEWS OF THE DRAWING

The above and further features of the present invention will become apparent to those skilled in the art after a study of the present disclosure of the invention and with reference to the accompanying drawings which are a part hereof, wherein like numerals refer to like parts throughout, and in which.

DETAILED DESCRIPTION OF THE PREFERRED EMBODIMENTS

Figure 1:
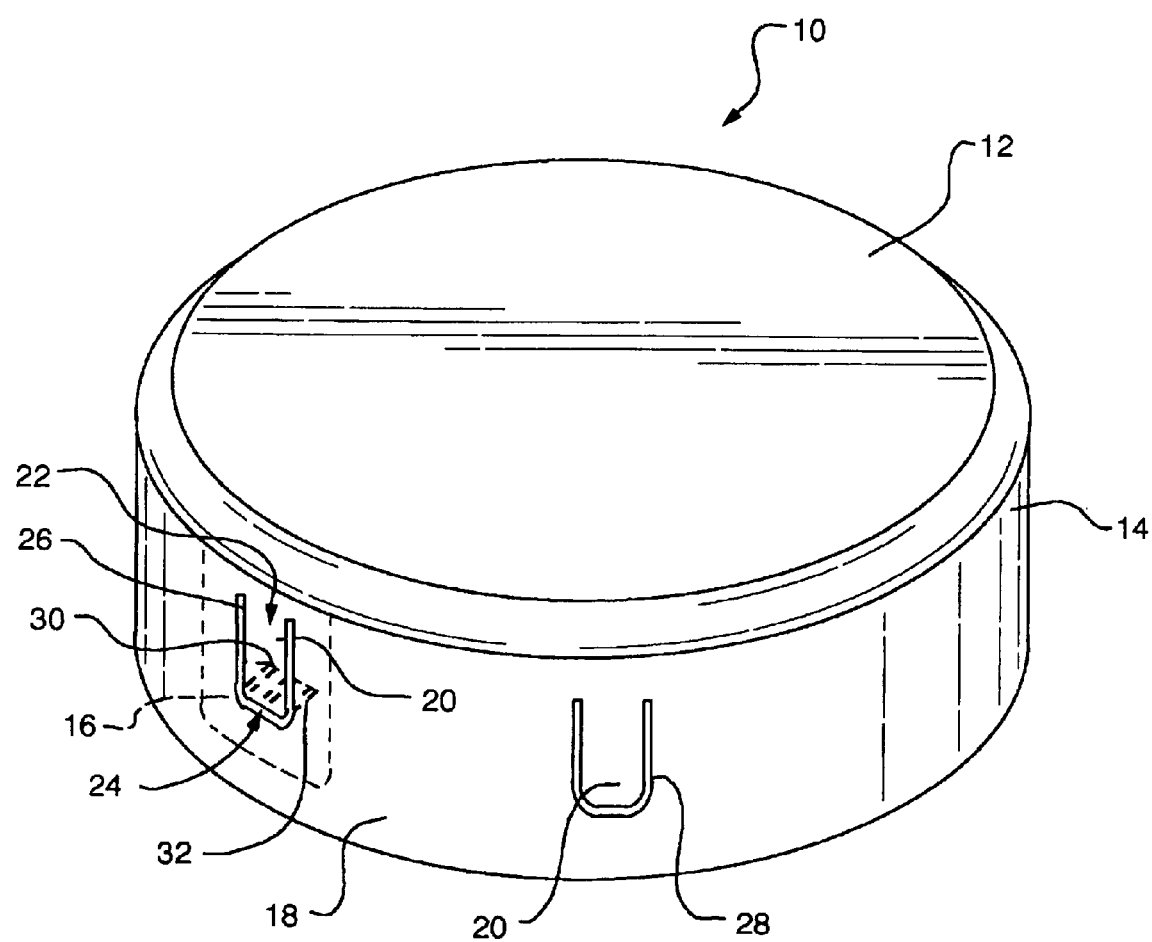
FIG. 1 is an isometric view of the end cap with integral tabs.

The following is a description of the preferred embodiment of the invention, with reference to the drawing Figures in which like reference numerals refer to like elements throughout. It is clear that there may be variations in the size and the shape of the end cap, in the materials used in the construction and in the orientation of the tabs, holes, end piece, and the skirt without departing from the scope and intent of the present invention. While the invention is preferably useful with corrugated conduit, it may also be used with smooth walled conduit. However, the main features are consistent and the particular objectives, features and advantages are as described below by way of non-limiting example.

In one embodiment of the invention, the detail of which is provided in FIG. 1, end cap 10 for closing conduit (shown later) comprises end piece 12, circumferential skirt 14 having inner and outer surfaces 16 and 18 respectively, and a plurality of connection tabs 20. End cap 10 is constructed to a shape that fits securely over the open end of the conduit which conduit is preferably corrugated conduit, but which may be smooth walled wherein a groove or valley is created at a distance from the open end so as to be mateable with the connection/connecting tabs (shown later), and thus skirt 14 inner surface 16 can be any appropriate diameter. End cap 10 may be constructed of virtually any hard but pliable material. Examples of possible construction materials include, but are not limited to plastics such as polypropylene and polyethylene. Other polymers, fibrous material, and even metal, rubber or rubber-like material may also be used.

Tabs 20 comprise integrally and hingedly attached end 22, triangular wedge 24, and tab leg 26, and tab 20 fits within opening 28 in skirt 14. There may be a plurality of connection tabs 20 which are used to hold end cap 10 in position on a corrugated conduit. Triangular wedge legs, horizontal wedge leg 30 and diagonal wedge leg 32, protrude away from tab leg 26 and towards the outer surface (shown later) of the corrugated conduit, and towards the interior of the end cap 10.

Figure 2A:
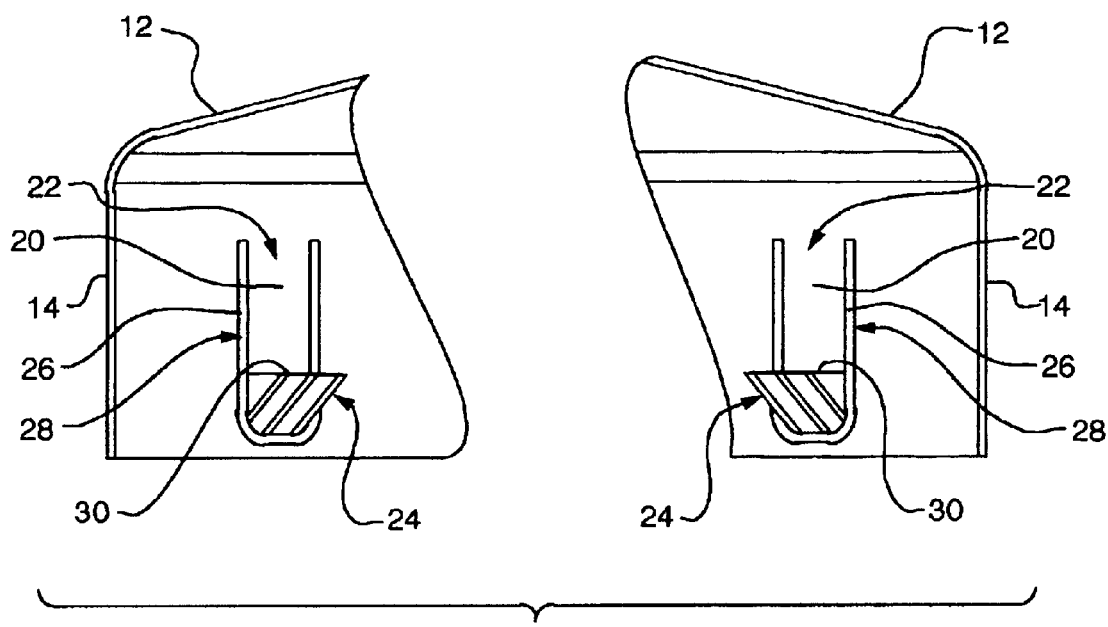
FIGS. 2A and 2B illustrate the positioning and detail of the preferred embodiment tabs on the inner surface of the end cap skirt.
Figure 2B:
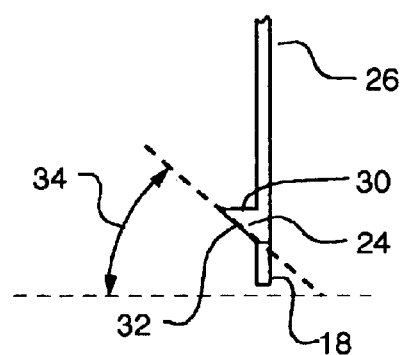

Referring now to FIGS. 2A and 2B, a tab 20 is explained. Tab 20 has a proximal end integral with and hingedly attached to circumferential skirt 14. Tab leg 26 begins at the proximal end and extends to triangular wedge 24 at a free distal end of tab 20. The base of triangular wedge 24 lies flush with tab leg 26. In the preferred embodiment, horizontal wedge leg 30 of wedge 24 forms preferably about a 90E angle with tab leg 26. Diagonal wedge leg 32, located below horizontal wedge leg 30, forms about a 30–60E angle with tab leg 26, with the preferred angle being 45E, as shown by angle 34 in FIG. 2B.

Figure 3:
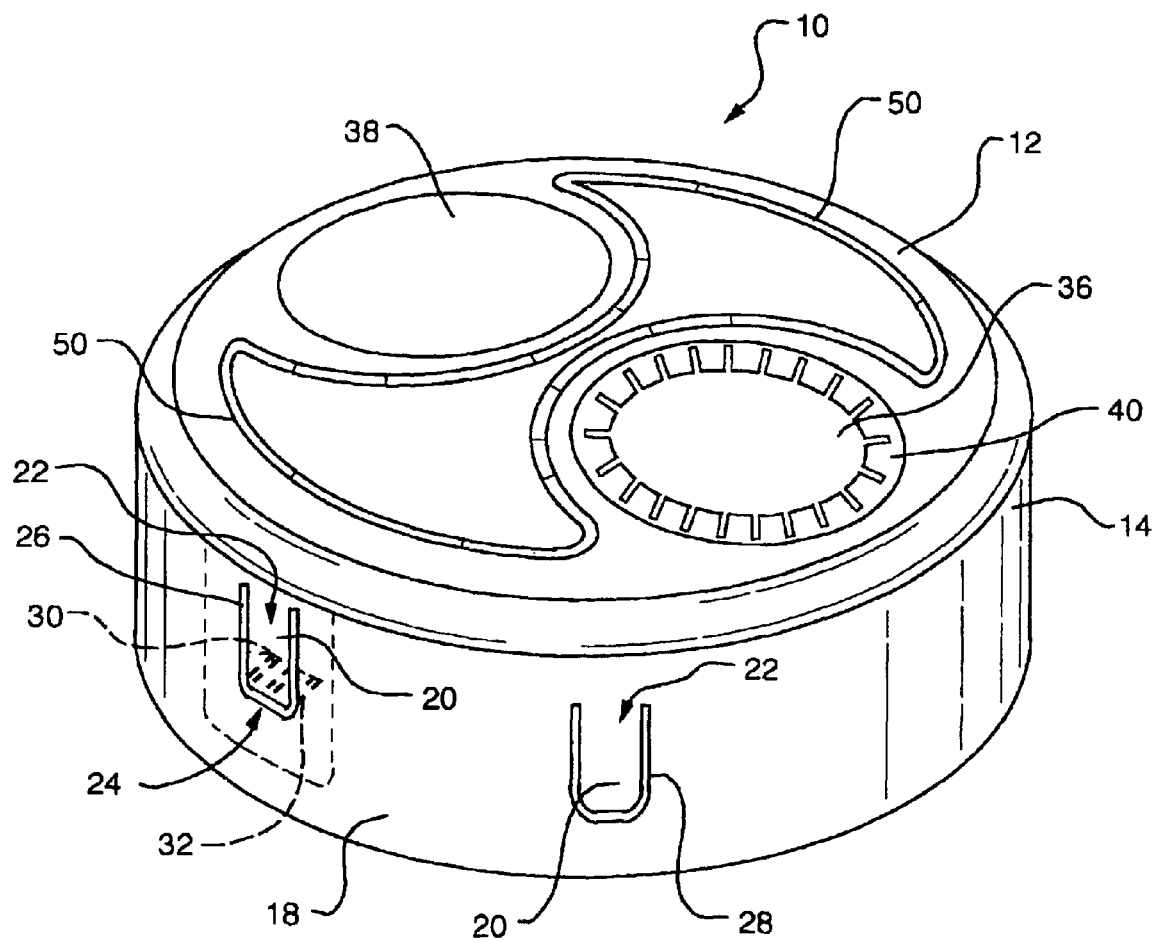
FIG. 3 illustrates an isometric view of the preferred embodiment of the invention comprising two possible hose recesses, a strengthening rib between the recesses, the skirt, and the curved end piece, with a cutaway view of one of the plurality of connecting tabs.
Figure 4A:
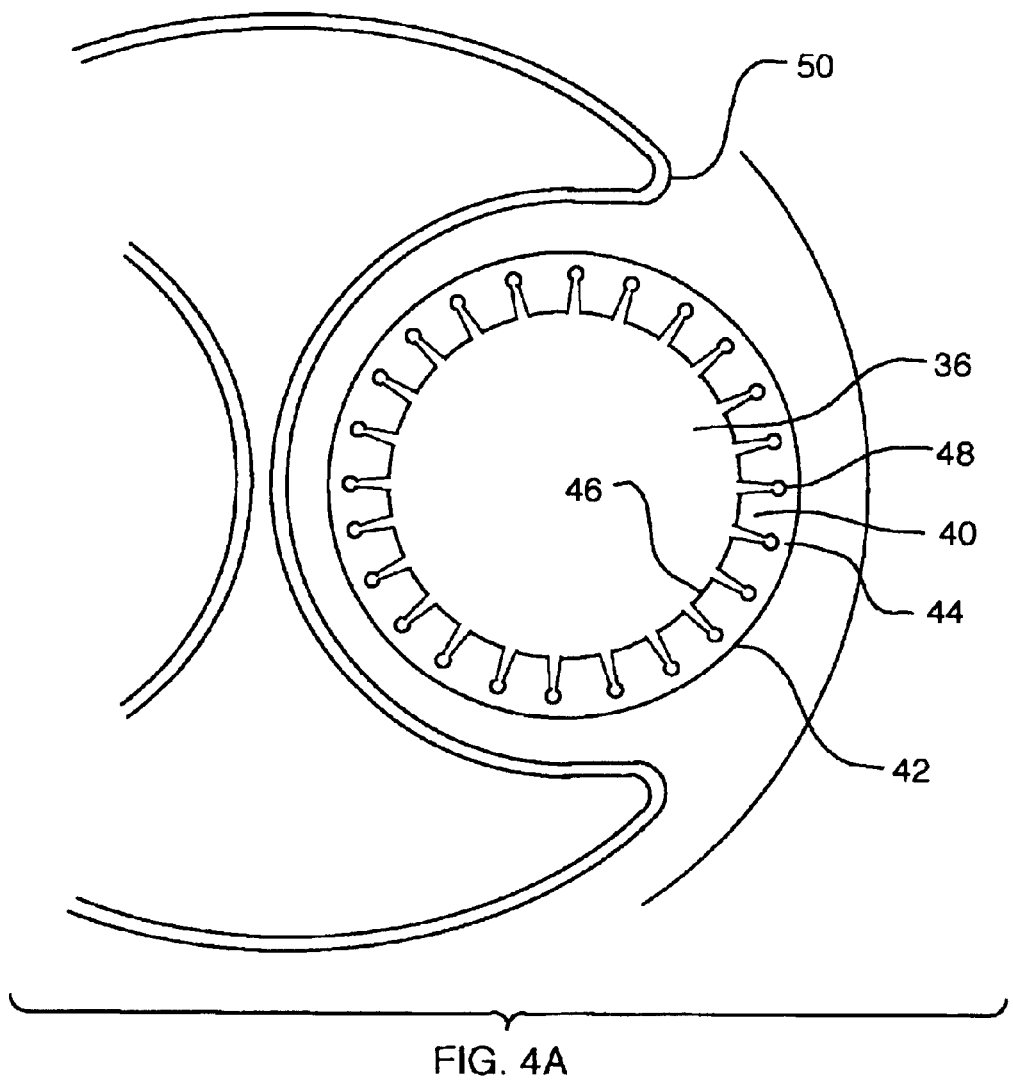
FIGS. 4A and 4B illustrate the positioning and detail of the recesses and fingers that provide for insertion and position maintenance of sewer and drainpipe hoses.
Figure 4B:
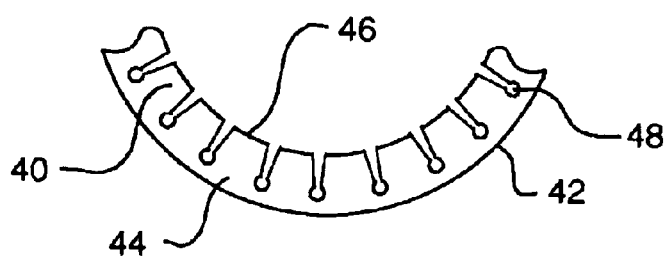

In another embodiment, shown in FIG. 3 and in greater detail in FIGS. 4A and 4B, holes 36 and 38 may be stamped or cut into end piece 12. Holes 36, 38 may be any size, and there may be any number of holes, depending on the application and usage of end cap 10. In addition, holes may be fitted with adapters (not shown) to make them smaller if need be. In the preferred embodiment, the circumference of hole 36 is fitted with fingers 40. Each finger 40 is hingedly and integrally attached to continuous ring 42 at its "inner" end 44. The free "outer" ends 46 of fingers 40 are able to swing towards and away from the corrugated conduit as a sewer and/or drainpipe hose is inserted or removed. Additionally each inner end 44 of each finger 40 is surrounded and separated by, in the preferred embodiment, spacer holes 48 which provide flexibility and tear resistance to fingers 40 and higher structural integrity. Hole 36 may be made larger by removing fingers 40 if need be. Either hole 36 or 38, or both holes 36 and 38 may be fitted with or without fingers 40 as desired.

Figure 5A:
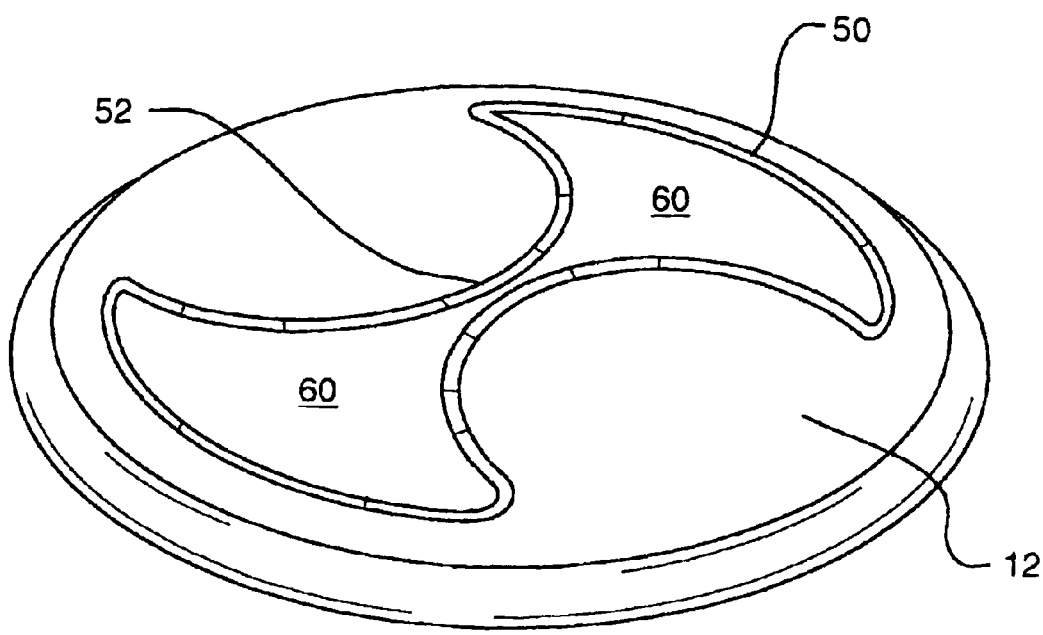
FIG. 5A is a perspective view of the strengthening configuration of the preferred embodiment end piece.
Figure 5B:
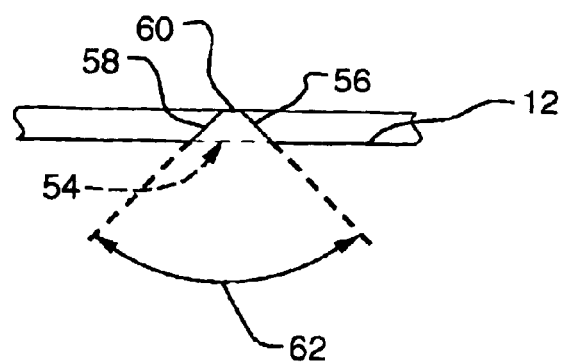
FIG. 5B is an enlarged view of the rib showing its shape and orientation relative to the surface of the end piece of the end cap.

Referring now to FIG. 5, another embodiment of the invention may include strengthening "rib" 50 or other device or means which comprises, in a preferred embodiment, a thickened strip of material formed integrally with end piece 12 of end cap 10. The example of a rib will be used herein for illustration only. Rib 50 is preferably formed of the same material of which end cap 10 is constructed, but may be formed of a different material. Rib 50 provides a selective increase in strength of end cap 10 in a key location in the vicinity of holes 36 and 38 which form the entry points for sewer and/or drainpipe hoses (shown later). Note that strengthening devices such as rib 50 may be located anywhere on the surface of end cap 10, including end piece 12 and skirt 14 to strengthen where needed. For example, ribs 50 might be positioned around openings 28 for tabs 20.

Rib 50, in the preferred embodiment, inscribes an hourglass-like shape on end piece 12 of end cap 10 to provide partial encirclement of holes 36 and 38 which are then positioned in adjacent the narrow section 52 of the hourglass-like shape formed by rib 50. As shown in this particular embodiment, ribs 50 comprise or form an apex-flattened triangle with base 54 flush with and integrally formed with the outer surface of end piece 12. Two opposing angled rib legs 56 and 58 of rib 50 meet apex-flattened area 60 and form angle 62 which may be any angle that is appropriate to the application or use of the end cap 10 and to the amount of thickening required. By way of example, a preferred angle 62 is about 60E.

Figure 6:
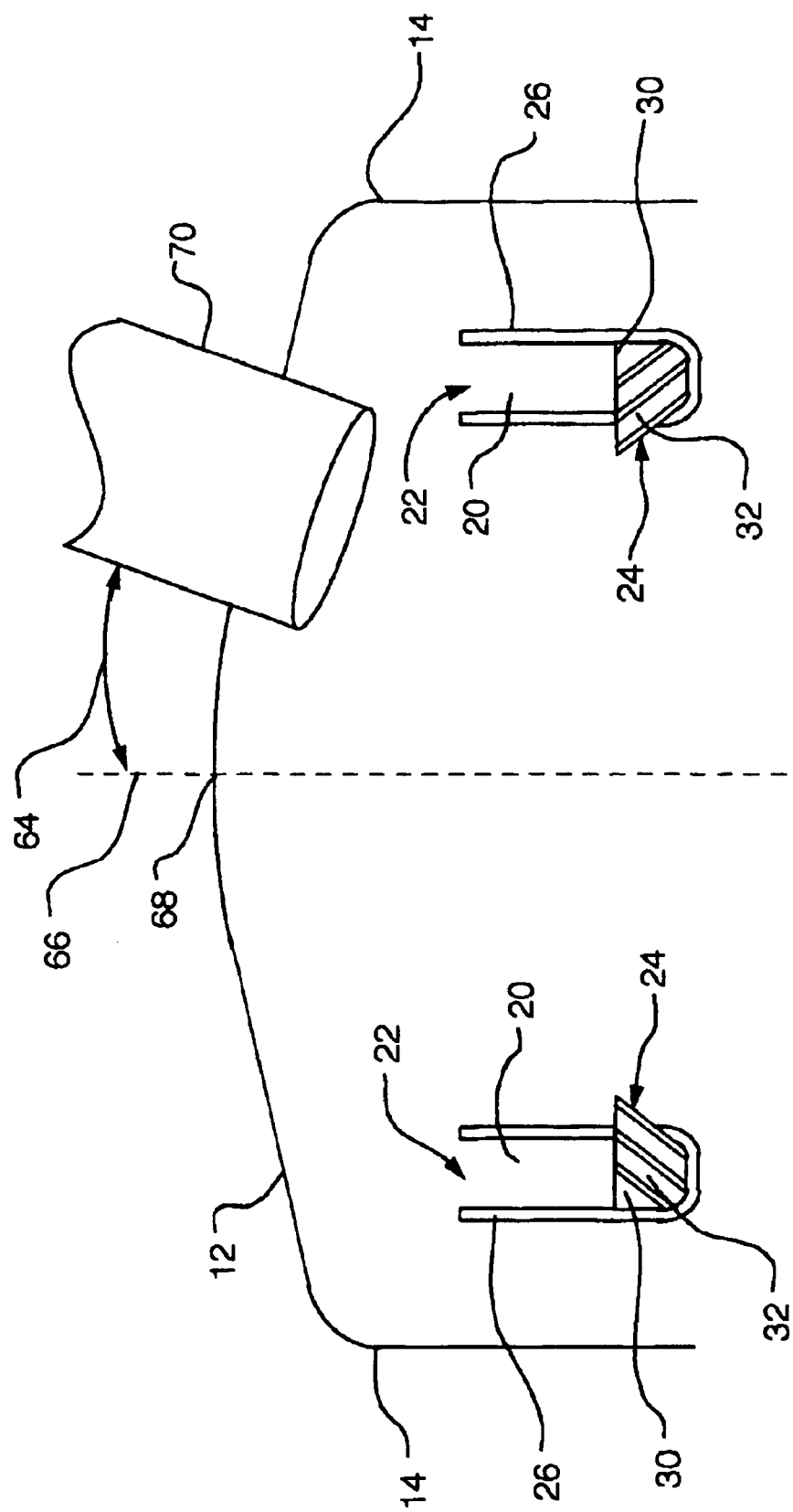
FIG. 6 is a plan view of the arcuate nature of the end cap in the preferred embodiment.

In another embodiment, as shown in FIG. 6, end piece 12 is arcuately shaped, and convexly protrudes from the corrugated conduit. End piece 12 may be convex towards the point at which closure pressure would be applied to the end cap. The apex of arced end piece 12 can form any angle with the vertical. In the preferred embodiment, however, and where there is accommodation for sewer and drainpipe hoses or other conduit, the angular displacement from the vertical axis parallel with the apex of the end piece sets the entry angle of the sewer or drainpipe hose which in turn determines the level to which the corrugated conduit may be filled before its contents enter and/or leave the attached sewer or drainpipe. In addition to providing for off-axis entry of sewer and drainpipe hoses, curvature of arced end piece 12 provides for additional structural integrity, especially during the pressure of inserting end cap 10 onto the end of the corrugated conduit. Further, arced end piece 12 increases the rigidity and structural integrity of end cap 10 during the insertion and extraction of sewer and drainpipe hoses.

As shown in FIG. 6, the curvature of end piece 12 forms angle 64 between axis 66 through the apex 68 of end piece 12 and sewer or drainpipe hose 70. Thus, the angle of curvature of end piece 12 determines the entry angle of hose or pipe 70 and its relative position within the conduit. In addition, the resulting position of hose or pipe 70 then determines how full the conduit may become before overflowing into hose or pipe 70. Clearly then the angle of curvature of end piece 12, and thus the angle entry of any attached sewer or drainpipes, may be varied as required by design requirements of a particular application. The angle of entry of conduit into the end cap 10 is very important and the variability of the entry angle provided by the present invention provides an end cap device superior in performance to other devices used to cap the end of a conduit and to provide coupling with other pipe or conduit. Depending on the application and use required, an end cap 10 of the present invention may be made with the curvature of end piece 12 formed as desired, even down to essentially having no curvature, and variously sized and shaped holes 36 and 38 may be formed to accommodate a variety of drain pipe, hose or other conduits to be connected to end cap 10. Thus the end cap 10 of the present invention has the flexibility to be made to provide a desired shape, curvature, number of holes and angles of entry of conduit, as required by a particular use or application.

In addition, the curvature of end piece 12 serves to strengthen end piece 12 in an area of increased stress, namely the area in which pressure will be applied to fix and secure end cap 10 into position on the end of a conduit.

Figure 7:
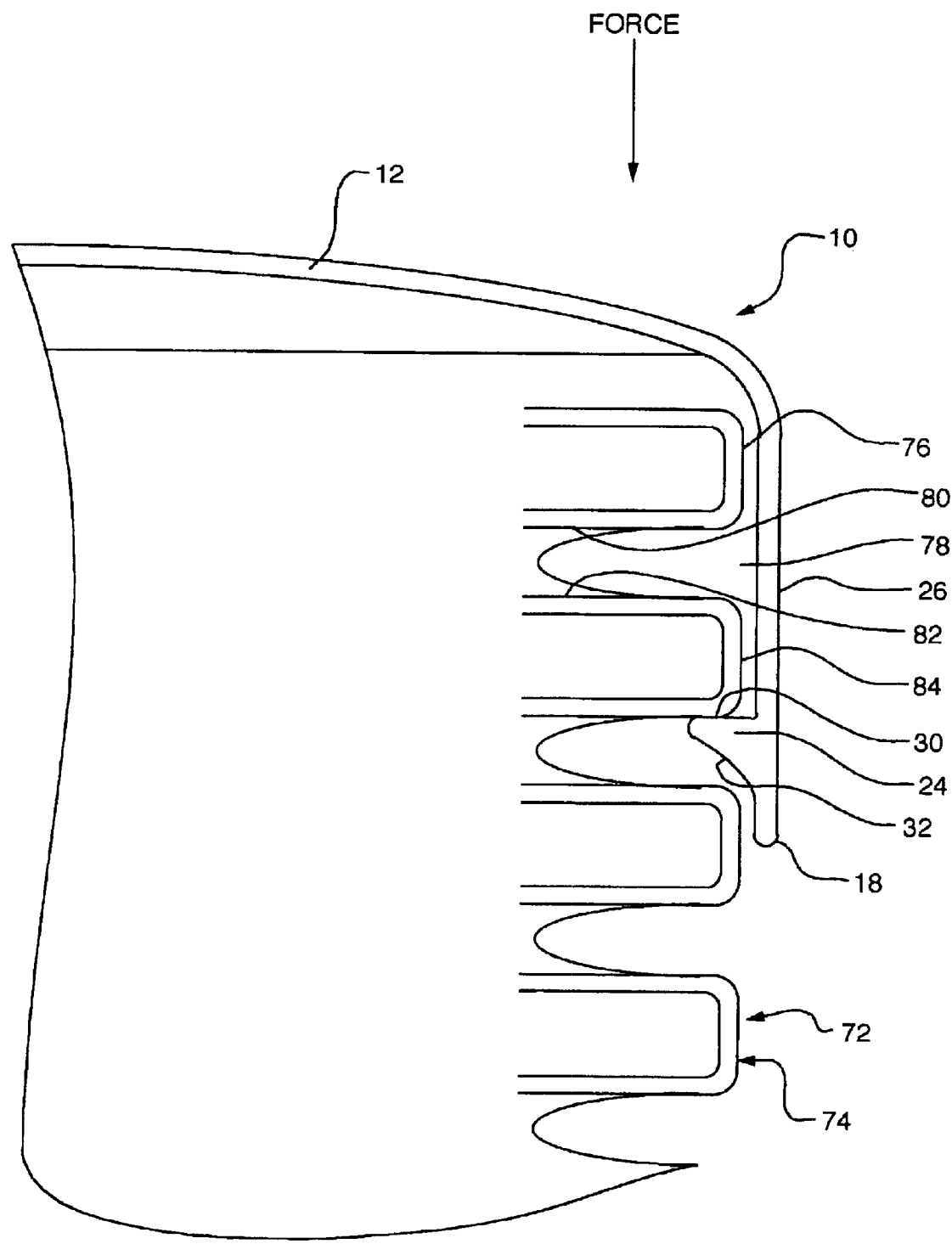
FIG. 7 is an isometric view illustrating the recesses/valleys of the corrugated conduit engaged with the tabs of the present invention, note that the recesses/valleys may alternatively be a groove or recess cut into the outer wall of a smooth walled conduit.
Figure 8:
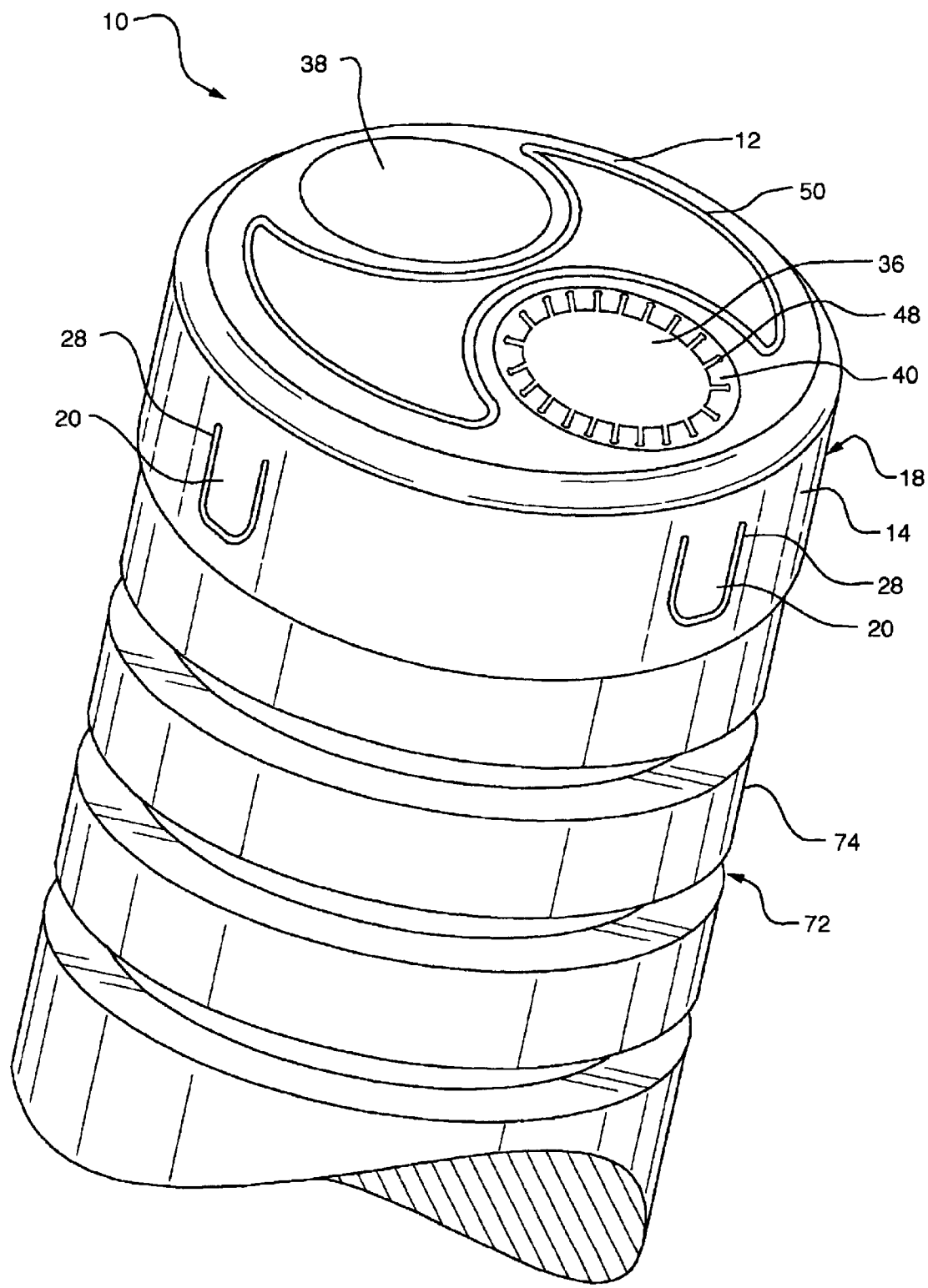
FIG. 8 is an isometric view of the end cap fitted securely onto a corrugated conduit section.

Finally, FIGS. 7 and 8 illustrate end cap 10 in position on the end of a conduit 72 and are used to illustrate how end cap 10 functions in the capping process. Referring to FIG. 7, it can be seen that during insertion of end cap 10 onto conduit 72 leg 26 swings, or is forced, away from outer surface 74 of conduit 72 as wedge 24 encounters the first protrusion or peak 76 of corrugated conduit 72. As further force or pressure is applied downward toward conduit 72, wedge 24 reaches and enters the first recess or valley 78 of corrugated conduit 72. Leg 30 slides flush with lower edge 80 of recess or valley 78 and is lodged there against further reverse motion that would attempt to disengage end cap 10 from conduit 72. If more force or pressure is applied to end cap 10 towards conduit 72, wedge 24 moves through recess 78 and leg 32 encounters upper edge 82 of the next protrusion or peak 84, at which point tab 20 again swings or is forced away from outer surface 74 of corrugated conduit 72 and then slides or settles into the next recess or valley.

FIG. 8 is a final view showing end cap 10 secured in position on the end of conduit 72. How far down corrugated conduit 72 end cap 10 extends depends on the length of skirt 14 which may be any length that assures secure attachment and support of end cap 10 on conduit 72.

It is thought that the present invention, the end cap for terminating conduit and most particularly closing corrugated pipe for use within a drainage field and many of its attendant advantages is understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. An end cap for corrugated conduit comprising:
   a solid end piece;
   a circumferential skirt formed around said end piece and having a plurality of solid connection tabs spaced circumferentially around said circumferential skirt; each of said plurality of connection tabs having a proximal end, integral with and hingedly attached to, said circumferential skirt; and a tab leg beginning at said proximal end and extending to a triangular wedge at a free distal end of said tab.

2. The end cap of claim 1 wherein said circumferential skirt comprises:
   a plurality of openings in each of which is located one of said plurality of tabs, and within each of which each said tab is freely swingable by its said proximal hingedly attached end.

3. The end cap of claim 1 wherein each said connection tab comprises:
   a horizontal wedge leg that protrudes out from said tab leg at an angle of about 90 deg.; and
   a diagonal wedge leg that protrudes out from said tab leg distal to said horizontal wedge leg at an angle of about 30–60 deg. and meets said horizontal wedge leg to form a wedge protruding from said tab leg, wherein as said end cap is pressed onto the end of a corrugated conduit, each said wedge engages and lodges in a valley of a corrugated conduit to prevent said end cap from dislodging from the end of a conduit.

4. The end cap of claim 3 wherein said diagonal wedge leg protrudes at an angle of about 45 deg. from said tab leg.

5. The end cap of claim 1, said end cap formed from a material chosen from the group consisting of: polypropylene, polyethylene, polymers, rubber, and fibrous material.

6. The end cap of claim 1 wherein said circumferential skirt comprises at least one means for creating a strengthened surface formed integrally thereon.

7. The end cap of claim 6 wherein said at least one means for creating a strengthened surface is formed of the same material as said circumferential skirt.

8. The end cap of claim 6 wherein said at least one means for creating a strengthened surface is disposed or located as desired about the location of each said opening containing said each said connection tab.

9. An end cap for a corrugated conduit comprising:
   a solid end piece having at least one conduit-receiving hole formed therein, said at least one conduit-receiving hole having a continuous ring attached circumferentially around said at least one conduit-receiving hole, and a plurality of fingers integral to and hingedly attached at an inner end of each said finger, to said continuous ring and protruding therefrom in towards the center openings of said at least one conduit-receiving hole, said inner end of each of said fingers separated from the adjacent said finger by spacer holes which enhance the flexibility and tear resistance of said fingers; and
   a circumferential skirt formed around said end piece and having a plurality of solid connection tabs spaced circumferentially around said circumferential skirt.

10. The end cap of claim 9 wherein said end piece comprises at least one means for creating a strengthened surface formed integrally thereon.

11. The end cap of claim 10 wherein said at least one means for creating a strengthened surface is formed of the same material as said end piece.

12. The end cap of claim 10 wherein said at least one means for creating a strengthened surface is disposed or located as desired between or around each said at least one conduit-receiving hole to enhance the strength of said end piece.

13. The end cap of claim 9 wherein said end piece is arcuately shaped, curving convexly away from an open end of a corrugated conduit that is capped by said end cap.

14. The end cap of claim 13 wherein a vertical axis through the apex of said convex curvature of said arcuate shape of said end piece and the location on said arcuate end piece of each said at least one hole determines an entry angle from said vertical axis, of a conduit inserted into or through said at least one hole, and also determines the relative position of the attached conduit wherein said entry angle thereby determines how full a capped conduit is permitted to become before material contained therein flows out of said capped conduit into the attached conduit.

15. The end cap of claimed 9 having a flexible outer end of each said finger, opposite said inner end, flexible as a pipe or conduit is inserted into said at least one conduit-receiving hole.

16. An end cap for a corrugated conduit comprising:
a solid end piece having at least one conduit-receiving hole formed therein, and at least one means for creating a strengthened surface formed integrally thereon; said at least one means for creating a strengthened surface forming an apex-flattened triangle with a base flush with and integrally formed with an outer surface of said end piece, and two opposing angled rib legs that rise from said outer surface of said end piece and are joined by a flattened top area to form said apex-flattened triangle; and
a circumferential skirt formed around said end piece and having a plurality of solid connection tabs spaced circumferentially around said circumferential skirt.

17. The end cap of claim 16 wherein an angle formed by said two opposing angled rib legs is about 60 degrees.

* * * * *